No. 727,760. PATENTED MAY 12, 1903.
H. E. EBERHARDT.
GEAR CUTTING MACHINE.
APPLICATION FILED FEB. 6, 1902.
NO MODEL. 7 SHEETS—SHEET 1.

Fig. 1.

Attest:
L. Lee.
Walter H. Talmage.

Inventor.
Henry E. Eberhardt,
per Thomas S. Crane, Atty.

No. 727,760. PATENTED MAY 12, 1903.
H. E. EBERHARDT.
GEAR CUTTING MACHINE.
APPLICATION FILED FEB. 6, 1902.
NO MODEL. 7 SHEETS—SHEET 5.

Fig. 6.

No. 727,760. PATENTED MAY 12, 1903.
H. E. EBERHARDT.
GEAR CUTTING MACHINE.
APPLICATION FILED FEB. 6, 1902.
NO MODEL. 7 SHEETS—SHEET 6.

No. 727,760. PATENTED MAY 12, 1903.
H. E. EBERHARDT.
GEAR CUTTING MACHINE.
APPLICATION FILED FEB. 6, 1902.
NO MODEL. 7 SHEETS—SHEET 7.

Attest:
L. Lee.
Walter H. Talmage.

Inventor.
Henry E. Eberhardt,
per Thomas S. Crane, Atty.

No. 727,760. Patented May 12, 1903.

UNITED STATES PATENT OFFICE.

HENRY E. EBERHARDT, OF NEWARK, NEW JERSEY, ASSIGNOR TO GOULD & EBERHARDT, OF NEWARK, NEW JERSEY, A CORPORATION OF NEW JERSEY.

GEAR-CUTTING MACHINE.

SPECIFICATION forming part of Letters Patent No. 727,760, dated May 12, 1903.

Application filed February 6, 1902. Serial No. 92,762. (No model.)

*To all whom it may concern:*

Be it known that I, HENRY E. EBERHARDT, a citizen of the United States, residing at 113 Orchard street, Newark, county of Essex, State of New Jersey, have invented certain new and useful Improvements in Gear-Cutting Machines, fully described and represented in the following specification and the accompanying drawings, forming a part of the same.

The invention relates to machines for cutting the teeth upon gear-blanks, and more especially to machines for cutting spiral gears, although certain of the combinations forming features of invention may be embodied in machines for cutting other forms of gearing.

The primary object of the invention is to provide an efficient machine for cutting spiral gears, in which the various operations are automatically performed, and a further object is to provide a machine of this character which is adapted to cut spiral gears of varying pitch, diameter, and lead.

In cutting spiral gears the gear-blank is secured upon a rotary support and is acted upon by a rotary cutter the axis of which is at an angle to the axis of the gear-blank, depending upon the diameter of the gear-blank and the lead of the teeth to be cut. The blank is rotated and either the cutter-support or the blank-support advanced in a direction parallel to the axis of the blank, so that the center of the cutter always lies in the same plane passing through the axis of the blank. The rotary movement of the work is in a definite ratio to the advance movement between the cutter and work, which ratio depends upon the lead of the gear being cut, and this ratio is preferably accurately maintained by gearing the work-support to the reciprocating support. On the return movement of the reciprocating support the cutter should be out of cutting relation, and this is readily accomplished by moving the blank out of cutting relation, although, so far as certain features of invention are concerned, it may be accomplished by moving the cutter. After each cut the blank is given a partial rotation or indexed to bring the blank into position for the next cut, and the mechanism for thus indexing the blank is preferably so constructed that the blank is indexed without disconnecting the mechanism which rotates the blank during the action of the cutter.

The annexed drawings show a machine embodying the invention, Figure 1 being a front elevation with the parts $C'$, $C^2$, and $C^4$ omitted, which are fully shown in Figs. 2, 3, 4, and 6. Fig. 5 is an elevation of the clutch mechanism for raising and lowering the blank-support, and Fig. 6 an elevation upon the right-hand side. Figs. 4 and 6 are upon a somewhat smaller scale than Figs. 1, 2, and 3.

The term "cutting relation" is used herein to define the position of the cutter and the gear-blank during the operation of the cutter to form the teeth in the blank. The term "gearing" is used herein to include toothed wheels, friction-wheels, friction-drivers, worms, shafts, links, slides, and any other moving parts which transmit motion from one element of the machine to another. The gear-blank is necessarily mounted upon a spindle, and that element which sustains the spindle and oscillates it to form spiral teeth thereon or rotates it intermittingly to space the teeth is termed the "blank-support."

In the drawings, which show merely one embodiment of the invention, the machine is shown of the type having a horizontal bed A, with vertical column B, having a bearing C movable vertically therein and adjusted by a screw $C'$ and nut $C^2$. A sleeve D is journaled in the bearing C and a blank-twisting wheel $D'$ attached thereto. The blank-support E is held rotatably in the sleeve and provided with worm-wheel $E'$ adjacent to the wheel $D'$.

The blank-support is formed with central bore to receive the blank-spindle 1, which is held therein by the nut 1½ upon the rear end. The bed is provided on top with parallel ways 12, and the cutter 2 is secured to an arbor 10, carried by the cutter-carriage 11. The ways are parallel with the axis of the blank-spindle 1, and the carriage thus moves parallel to the axis of the blank J. The entire machine is driven by a continuously-running driving-shaft 13, which is extended across the bed near the base of the column and provided with driving-pulley I at the right-hand end.

*Cutter-driver.*—A side shaft 3 is extended parallel with the ways and connected with the driving-shaft adjacent to the pulley by spiral gears in a case 4. A circular turn-table 6 carries the bearings of the cutter-arbor 10 upon the carriage 11 and is secured thereon by the bolts shown when adjusted at the desired angle. A vertical shaft 14 is supported upon the carriage in the center of the table and is connected by gears $k$ with a horizontal shaft 8 in the carriage and a similar shaft 7 upon the table. The shaft 7 is geared to the cutter-arbor 10 by change-wheels 9, and the shaft 8 is connected with the side shaft 3 by gears in the case 15. The gear within the casing 15, which is fitted to the side shaft 3, is splined or keyed movably thereon, and the side shaft is thus enabled to drive the cutter in all positions of the carriage and table.

Figure 6:
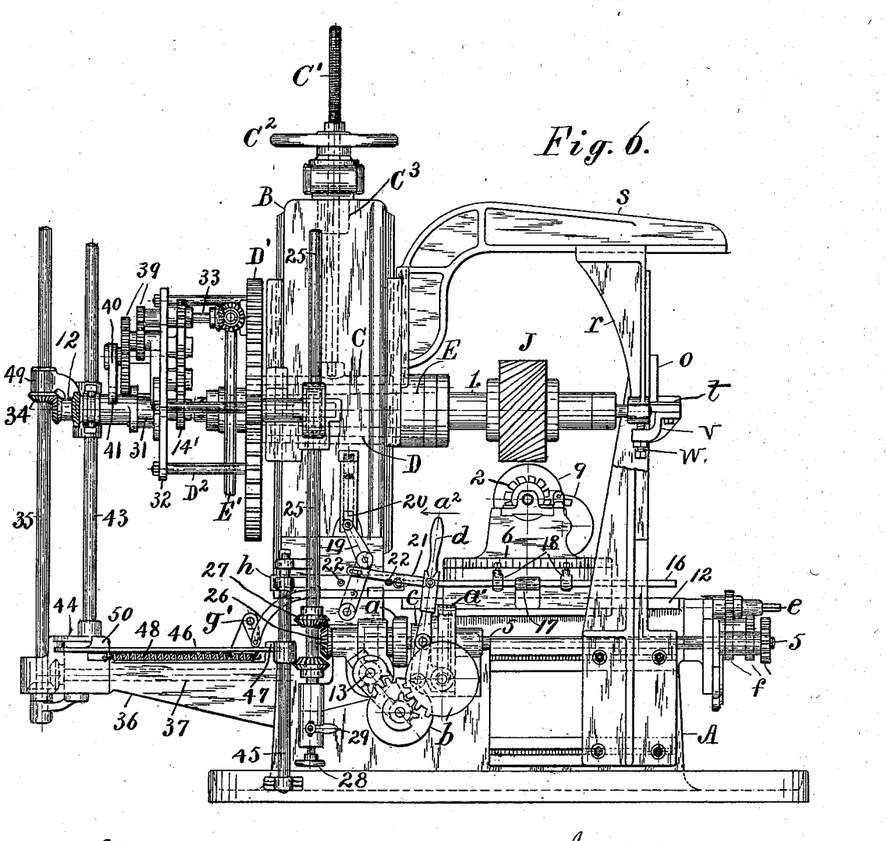
Figure 7:
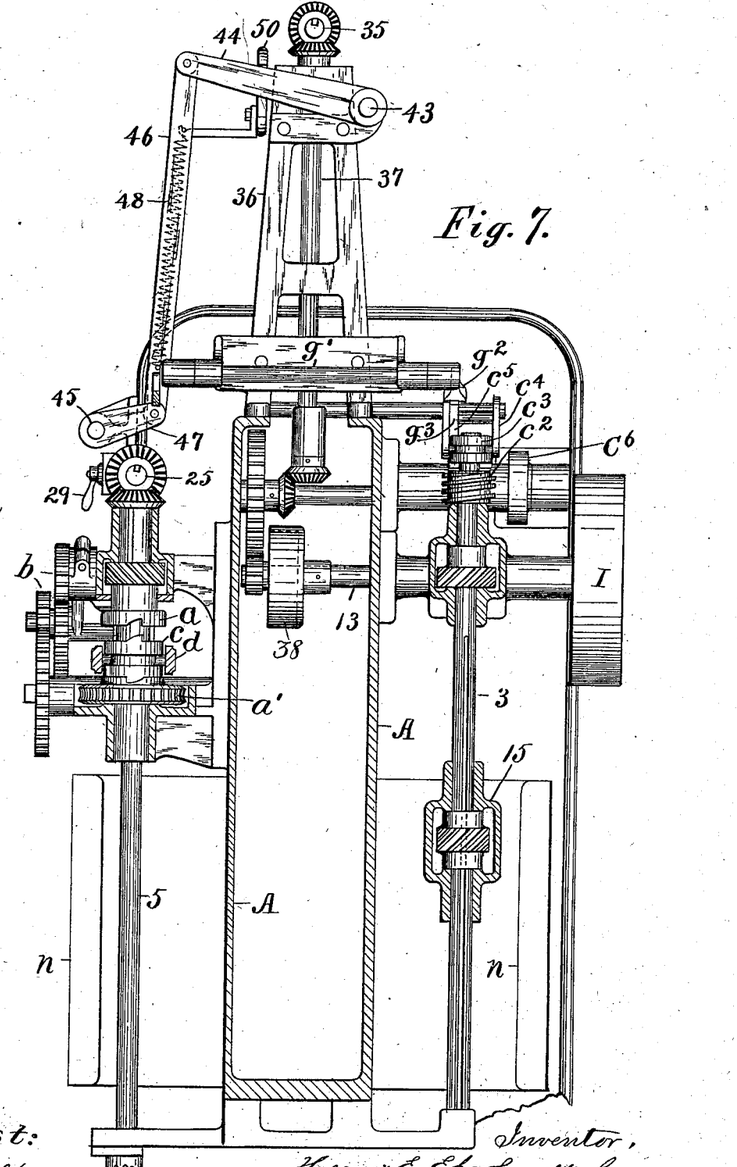
Fig. 7 is a horizontal section of the bed at the level of the side shaft and feed-shaft, showing the various connections below that level.
Figure 8:
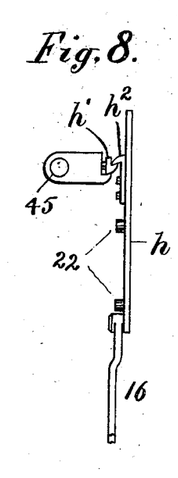
Fig. 8 is a plan of the slide and its trip connection with the indexing rock-shaft.

*Carriage feed and reverse.*—The end of the driving-shaft 13 upon the left-hand side of the machine is geared directly by spiral gears to a clutch $a$, which is thereby turned quickly upon the feed-shaft 5, and it is geared indirectly through intermediates $b$ to another clutch $a'$, which is driven by a worm and worm-wheel, and is thus turned slowly upon the feed-shaft 5 in the opposite direction to the driver $a$. A shaft-clutch $c$ is fitted to turn with the shaft 5 and is provided with a hand-lever $d$, by which it may be engaged with either of the drivers $a$ or $a'$ which run continuously, and thus operate according to the position of the lever $d$ to turn the feed-shaft in either direction. Figs. 6 and 7 show the shaft-clutch $c$ engaged with the clutch $a'$ to turn the feed-shaft slowly, as is required during the feeding movement of the carriage, which (in the machine illustrated) is toward the column, as indicated by the arrow $a^2$. The carriage is provided with a nut (not shown) to which a screw-rod $e$ is fitted, and the outer end of the same is connected with the feed-shaft 5 by change-wheels $f$. A trip-rod 16 is extended by the side of the carriage through a lug 17 upon the same, and dogs 18 are secured adjustably upon the trip-rod to move the same by contact with the lug 17. The trip-rod 16 is connected directly to a trip-slide $h$, which is supported to move across the side of the column B. Toggle-links 19 are pivoted, respectively, upon the bed and to a spring-plunger 20 (shown in Figs. 2, 3, and 6) with one of the links transverse to the slide. A pin upon such link is fitted to a slot in a link 21, which is attached to the clutch-lever $d$. The slide $h$ is provided with pins 22, projected therefrom, so as to strike the link when the slide is reciprocated by the movement of the trip-rod 16, and the alternate movements of the trip-rod thus operate to shift the link alternately to the left and to the right. The spring-plunger 20 operates to keep the links normally bent and to shift them quickly to their extreme position when moved past the center line by the pin 22. The slot in the link 21 permits the toggle to reach a central position without affecting the clutch-lever $d$, after which any further movement permits the spring-plunger to act quickly upon the links and shift the clutch instantly from one clutch-driver to the other. The movement of the feed-shaft 5 is thus reversed at the end of each cutter-stroke in either direction. The slide $h$ also performs the function of operating a latch which controls the mechanism for raising and lowering the blank-support and for operating a stop which controls the gearing for indexing the blank.

*Raising of blank-support.*—The screw C' passes through a vertical guide $C^3$ upon a bearing upon the top of the column. A lever $C^4$ is forked to embrace the screw and pivot it to a fulcrum upon such bearing, and the nut $C^2$, to which the screw is fitted, is supported by a block pivoted in the lever $C^4$, so that the raising and lowering of the lever operates to raise and lower the screw and the bearing C. The end of the lever is raised and lowered automatically by a rod $C^5$ and eccentric cam $C^6$. (See Figs. 2, 4, and 5.) The eccentric cam $C^6$ is rotated a half-revolution to raise the blank-support at the conclusion of the cutter-feed and holds the blank raised during the return of the cutter-carriage and the rotation of the blank for indexing the teeth, and the cam is then rotated another half-revolution to lower the blank to its initial position. The cam $C^6$ is driven by a worm-wheel $c'$ and a worm $c^2$, fitted loosely upon the side shaft 3 and engaged therewith when required by a clutch $c^3$. A clutch-lever $c^4$ is pressed (to engage the clutch with the worm) by a horizontal spring (shown in Fig. 4) extended from the clutch-lever to the bearing of the driving-shaft 13, and a latch $c^5$ is pivoted upon the clutch-lever, with its end in the path of toes $g$, projected from the worm-wheel $c'$ and operating by their contact with the latch at each half-rotation of the cam to force the clutch-lever outward and disengage the clutch from the worm which arrests the worm-wheel in the position shown in Fig. 5. The latch is actuated by connection to the slide $h$ through a latch-shaft $g'$. (Shown in Figs. 2, 4, 5, 6, 7.) The latch-shaft $g'$ has a crank at one end, having a connection to the toggle-link 19 and a crank $g^2$ at the other end, provided with a roller, which operates upon a tooth $g^3$ on the latch $c^5$. The oscillation of the latch-shaft at each movement of the toggle-links throws the crank $g^2$ to the right or left, and by either movement depresses one end of the latch, causing the other end to tip up and slip off of the toe $g$ upon the worm-wheel. The spring which draws the clutch-lever $c^4$ toward the worm immediately operates to engage the clutch $c^3$ with the worm, and the eccentric cam is rotated to raise or lower the blank-support until the worm-wheel and cam have made a half-revolution, when the opposite toe $g$ again presses upon the latch and detaches the clutch from the worm. A spring $g^4$ draws the inner end of the latch normally downward, and a stop $g^5$ limits its movement, thus holding the tooth $g^3$ in the path of the roll upon the lever $g^2$. The mechanism thus operates at the inner extreme of the cutter-carriage movement to raise the blank from the cutter and at the opposite extreme to lower it in readiness for cutting another tooth.

Figure 2:
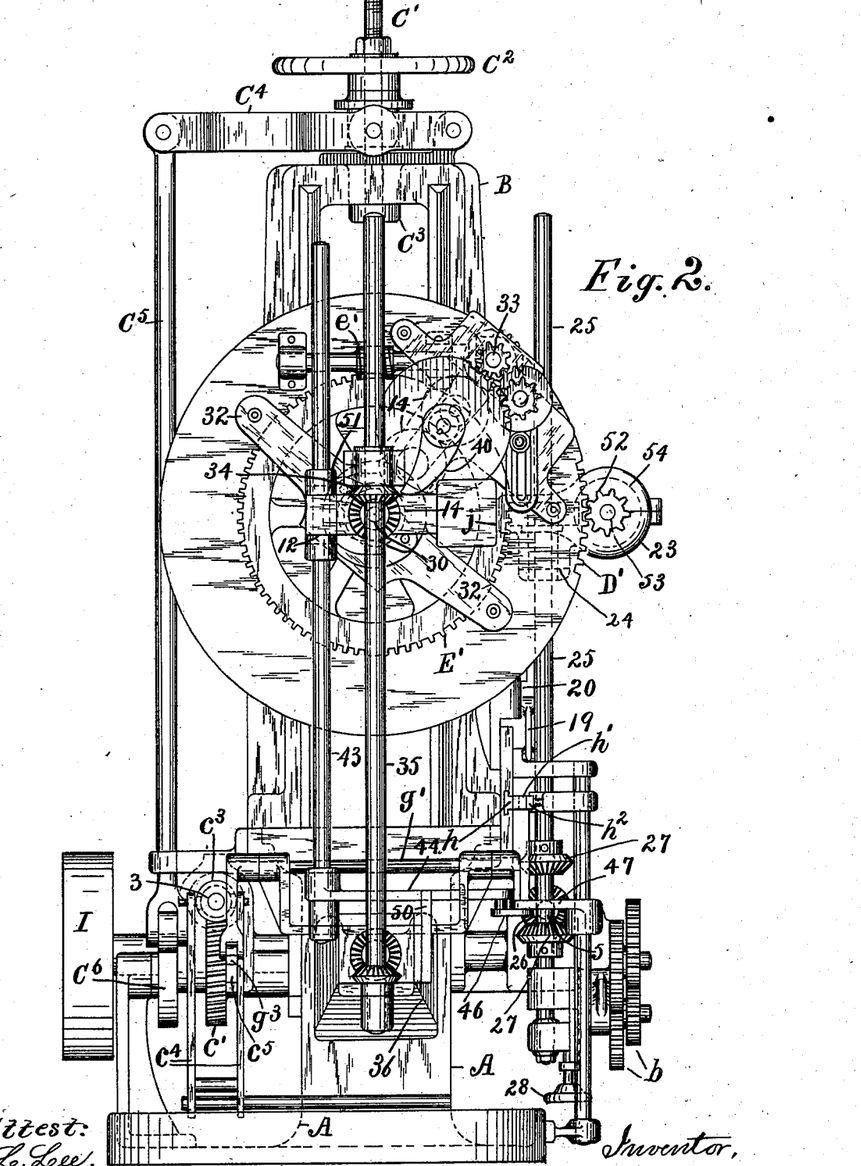
Fig. 2 is a rear elevation, Fig. 3 a plan, and Fig. 4 an elevation upon the left-hand side of the machine.
Figure 3:
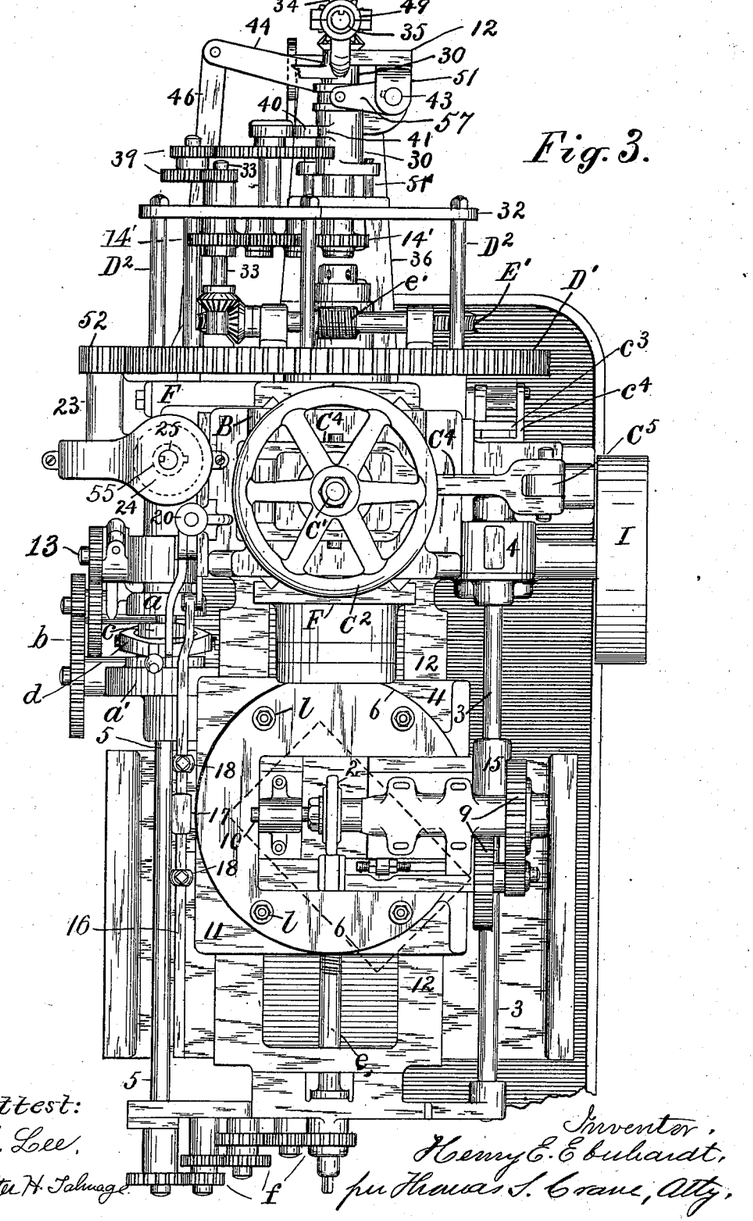
Figure 9:
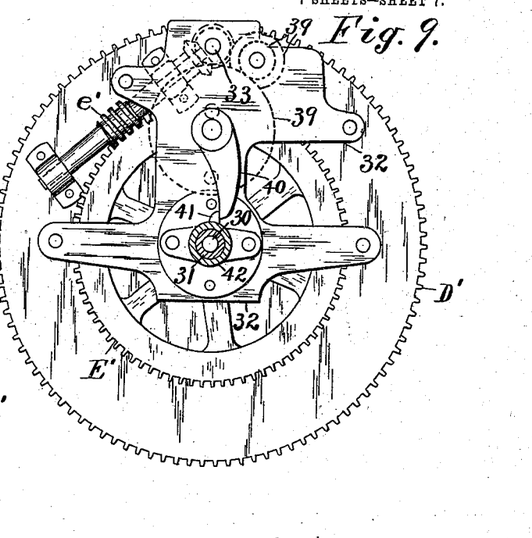
Fig. 9 is an elevation of the blank-twisting wheel and some of its attachments.
Figures 11, 12:
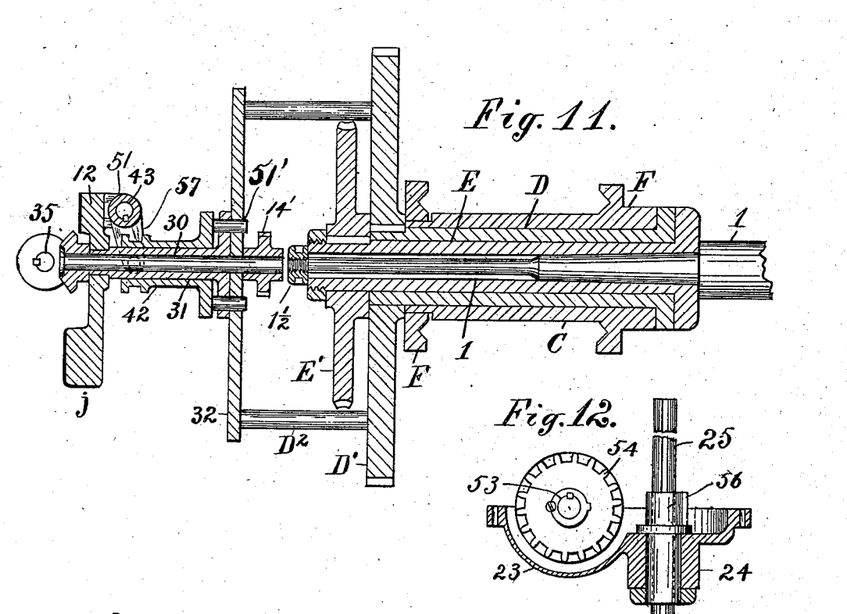
Fig. 11 is a horizontal section of the mandrel-support and all the gearing in line with the same.
Fig. 12 is an elevation of the gear-case and change-wheels connecting shaft 25 with the blank-twisting wheel.

*Spiral feed of blank.*—The index worm-wheel E' is held in any desired angular relation to the wheel D' by a worm $e'$, journaled in bearings upon the wheel D', as shown in Figs. 2 and 9. The turning of the blank-twisting wheel D' thus operates to turn the blank-support and the blank-spindle for making a spiral cut in the blank, while the rotation of the worm-wheel E' is used to index the teeth of the blank by turning the blank-support E within the sleeve of the wheel D' through the means to be hereinafter described. The bearing C for the mandrel-support and the sleeve of the blank-twisting wheel D' is provided with slides forming a head F, movable upon the column B, and such head, as shown in Fig. 2, is provided adjacent to one edge of the blank-twisting wheel with a bearing 23 for a shaft 53, carrying a pinion 52 in engagement with the blank-twisting wheel. Attached to the bearing 23 is a bearing 24 for an upright shaft 25, which is connected to the feed-shaft 5. The shafts 25 and 53 are shown with spiral wheels 54 and 55, and Fig. 12 shows the top of their casing removed to change such wheels to vary the speed when required. The wheel 54 is shown attached to the shaft 53 in this figure, and the other wheel removed from the sleeve 56, which is carried by bearing 24 and feathered to slide upon the shaft 25. The feed-shaft 5 is shown provided with a bevel-wheel 26, and bevel-wheels 27 are shown upon the shaft 25 at opposite sides of the wheel 26. The engagement of such wheels with the wheel 26 serves, respectively, to rotate the shaft 25 in opposite directions for cutting spirals of right or left hand inclinations. A screw, with hand-wheel 28, is shown beneath the bearing at the bottom of the shaft 25 for raising and lowering a step in the bearing which supports the shaft 25 to bring either of the wheels 27 into engagement with the wheel 26, and a clamp-screw is shown with handle 29 to clamp the step when thus adjusted. It will be understood that the shaft 5 is a continuous shaft extending from the wheel 26 to the change-wheels $f$, which connect the feed-shaft with the cutter-carriage feed-screw $e$. The blank-twisting wheel D' is kept in permanent connection with the feed-shaft 5 during the cutting of any gear-blank, and the blank is thus gradually turned in a definite ratio to the advance movement of the cutter to form the tooth spirally at the required angle. The return movement of the cutter-carriage is made as rapidly as possible through the connection of the feed-shaft 5 with the quickly-running driver $a$, and the blank-twisting wheel is then turned in the reverse direction with the same rapid movement which restores the blank to the position occupied at the beginning of the cut. The rate with which the blank-twisting wheel is turned in relation to the advance of the cutter is varied at pleasure by the change-wheels $f$ and the change-wheels 54 and 55. A change in the ratio of the latter is used to secure extremes of quick or slow motion which may not be procurable by the change-wheels $f$. If the blank-twisting wheel were positively connected to the blank-spindle, the cutter would then traverse the same groove again, but the blank-spindle and the blank-support are attached to the index worm-wheel E', which is carried through a partial rotation after the cutting of each tooth to index the blank.

Figure 10:
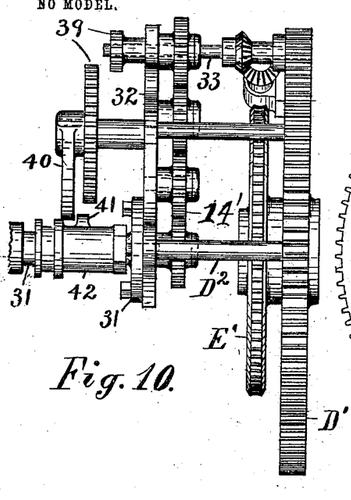
Fig. 10 is an edge view of the same.

*Blank-indexing mechanism.*—To index the blank by an intermittent partial rotation of the index worm-wheel E' it is necessary to support a gear-shaft in axial alinement with the center of the worm-wheel and to connect such center gear-shaft with the driving-shaft to rotate intermittently after the cutting of each tooth. As the worm-wheel changes position with the indexing of each tooth the motion is easily transmitted to it upon its own center line, which is effected by supporting the bearing of the center gear-shaft upon the wheel D', which is concentric with the worm-wheel. The partial rotation of the worm-wheel is effected by connecting an indexing-shaft 35 with the indexing-worm by a train of gearing and with the driving-shaft by a friction-driver constantly impelling it to rotate such worm and interposing a stop in the train of gearing with connection to the cutter-carriage to move the stop and secure the actuation of the train just before each cut. Change-wheels are inserted between the rotary part carrying the stop and the indexing-worm so as to vary the amount of its rotation for each actuation of the stop, and the blank-support is thus turned within the sleeve of the blank-twisting wheel the required amount at the beginning of each cut. The rotary part carrying the stop is so controlled by the stop as to move uniformly through a complete rotation or arc of thirty-six degrees, and the proportions of the change-wheels (designated 39 in Figs. 9 and 10) may be varied so as to rotate the indexing-worm through a much greater or less arc, as may be required to turn the blank. The center gear-shaft is designated 30 in Figs. 9 and 11 and is sustained in a center bearing 31 upon a plate 32, attached to the blank-twisting wheel D'. The plate is attached to the wheel D' by posts $D^2$, attached to the blank-twisting wheel D' at a suitable distance to permit the introduction of gear-wheels 14', which connect the central gear-shaft with an indexing-worm-driving shaft 33, which drives the spindle of the indexing-worm $e'$. A train of equal wheels 14' is shown; but change-wheels may be used in the train to vary the speed of the worm $e'$. A yoke 12 is journaled upon the end of bearing 31 to carry an upright shaft-box 49, in which a gear-wheel 34 is journaled, and a vertical indexing-shaft 35 is splined to such gear-wheel to drive the gear at different elevations. The indexing-shaft is journaled upon a bracket 36 at the rear end of the bed and geared to a shaft 37, which, as shown in Fig. 7, is connected with the driving-shaft 13 by a friction-driver 38. A train of change-wheels 39 connects the index-worm-driving shaft 33 with a rotatable stop-arm 40 and a laterally-movable stop 41 (shown in Figs. 6, 9, and 10) is held movably upon the bearing 31 and moved laterally from the stop-arm when required by a sleeve 42 and forked arm 57. Pins 51' are extended from the sleeve through the plate 32 to keep the sleeve from turning as it slides on the bearing 31. Ears 51 are projected from the yoke 12 to carry the forked arm, and a stop-release shaft 43 is splined to such arm to oscillate the same. A weight $j$ (shown in Figs. 2 and 11) is projected from the yoke upon the opposite side of the bearing 31 to balance the bearing and avoid a tendency to twist the yoke and cramp the shaft 43. The stop-shaft 43 is provided at the bottom with a lever 44, which is oscillated upon the return movement of the cutter-carriage by a link 46 and a connection with the slide $h$ as follows: An upright trip-shaft 45 is extended by the rear end of the trip-slide $h$, as shown in Figs. 6 and 8, and connected with the lever 44 by an arm 47. A spring 48, applied to the arm 47, tends constantly through the stop-release shaft 43 and sleeve 42 to hold the stop 41 in engagement with the stop-arm 40. An arm projected from the trip-shaft 45 toward the slide $h$ is provided at its end with a spring-finger $h'$ to temporarily engage a trip-hook $h^2$ upon the slide in the forward movement of the latter. The oscillations of the trip-shaft 45 and stop-shaft 43 are limited by projections 50 upon a plate at opposite sides of the arm 44. The movement of the trip-slide $h$ when the cutting stroke of the cutter is nearly completed presses the hook past the spring-finger, so that it engages the same, when the return movement of the carriage shifts the slide in the reverse direction, and such return movement of the slide then oscillates the shaft 45 and moves the stop 41 laterally from the stop-arm 40. Such movement of the trip-shaft 45 is in opposition to the spring 48, and the hook is constructed to slip past the finger before the movement of the slide is completed, thus permitting the spring to operate and throw the stop back quickly into the path of the stop-arm 40. When the stop is withdrawn, the friction-driver 38 sets the indexing-shaft 35 and the central gear-shaft 30 in motion, which rotates the indexing-worm $e'$ until the stop-arm 40 is arrested. The extent of rotation may be varied by the change-wheels 39, so that a single rotation of the stop-arm may correspond with a fractional rotation of the indexing worm-wheel E'. The blank-support E is thus turned within the sleeve of the blank-twisting wheel D', which oscillates through a fixed arc during the cutting of each tooth, and at the succeeding advance of the cutter a new tooth is cut at the required distance from the last one formed.

*Automatic operation of the machine.*—The driving-shaft 13, as shown in Fig. 7, is connected with the side shaft 3, which drives the cutter, with the worm $c^2$ to raise the blank-support, with the feed-shaft 5, which feeds the cutter-carriage, returns it, and drives the blank-twisting wheel, and with the indexing-shaft 35, which shifts the index worm-wheel intermittently. The reversal of the feed-shaft 5 to reverse the movement of the cutter-carriage and the rotations of the blank-twisting wheel are effected automatically by the operation of the toggle-links 19 upon the clutch $c$, and the period for such movements of the toggle-links is adjusted in the usual way by the dogs upon the trip-rod 16. The rotation of the cam which raises the blank-support is effected through the latch-shaft $g'$ and its connection to the toggle-link and is thus effected automatically by the engagement of the trip-hook $h^2$ with the spring-finger $h'$, which releases the stop-arm 40 temporarily and permits the rotation of the index-worm.

*Operation of cutting a gear.*—The cutter is adjusted in the carriage with its center below the axis of the blank-spindle, and the blank-support is adjusted at the desired position upon the column B to cut the blank by the penetration of the cutter. The turn-table 6, as shown in Fig. 6, is graduated to set the cutter-spindle and cutter at any desired angle to the axis of the blank-spindle, and the angle being known at which the teeth are to be inclined in the blank the turn-table is adjusted and clamped at such angle. The dogs 18 are adjusted in the usual manner to regulate the stroke of the cutter-carriage to move the cutter through the blank, and the connection of all the parts thereafter performs successively the operation of feeding the cutter across the blank, turning the blank upon its axis to form the spiral tooth, raising the blank-support when the cutting stroke is completed, returning the cutter-carriage when the blank is raised, tripping the indexing mechanism just before the close of the return movement of the carriage, and shifting the indexing worm-wheel in its relation to the blank-twisting wheel D', then lowering the blank into position for cutting another tooth and advancing the cutter through the blank, as before. To avoid making an oblique projection or view of the cutter-carriage, its bearing, spindle, and gearing, the cutter-spindle is shown in full lines at right angles to the blank-spindle; but in Fig. 3 the bearings of the cutter-spindle are shown in dotted lines at an angle of forty-five degrees to the blank-spindle, thus holding the cutter in a suitable position to cut teeth at such an angle.

Figure 1:
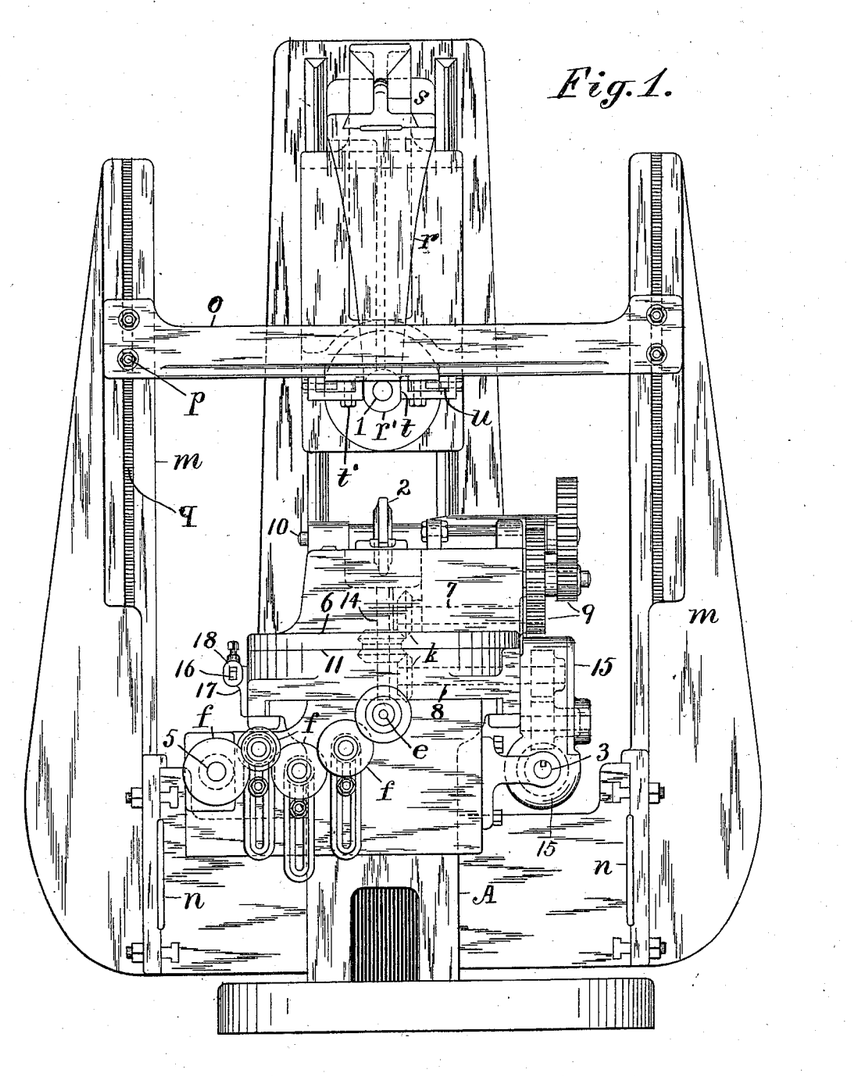
Figures 4, 5:
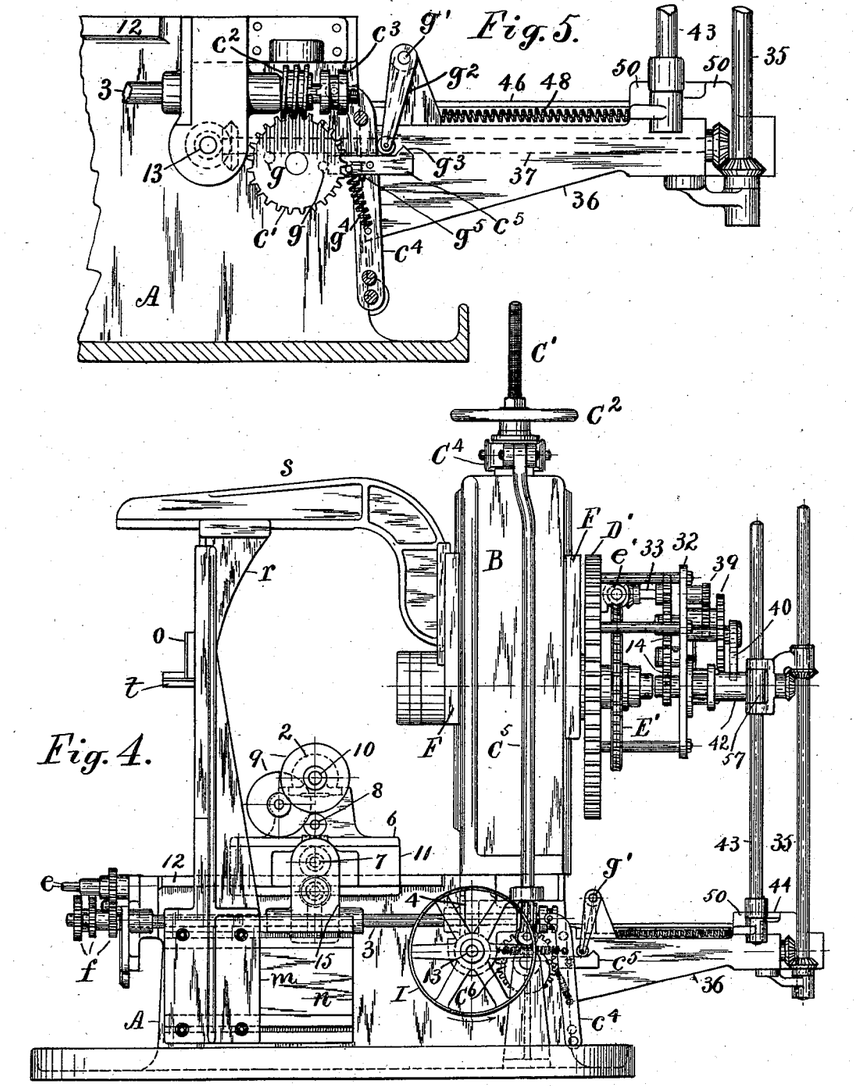

It is common in gear-cutters to brace the outer end of the blank-spindle by some means during the cutting operation; but in a machine where the blank-support is moved to clear the blank from the cutter during each return movement of the same it is obvious that a fixed support cannot be employed for the outer end of the blank-spindle, and the present invention therefore provides means for steadying the outer end of the blank-spindle in both a vertical and lateral direction while permitting the movement of the blank-support as required. Such means consists of guides fitted to the end of the blank-spindle and extended in the line of its retracting movement. The guides are preferably applied to an eye or socket upon the end of a bracket extended from the head which moves the blank-support, such bracket performing the usual function of resisting the thrust of the cutter toward the blank-spindle, while the guides resist any motion in a lateral direction. To hold the guides firmly and adapt them for adjustment to the blank-spindle when arranged at various distances from the cutter to suit blanks of various diameters, I attach posts to the opposite sides of the bed, with a bar adjustable upon the same in the line of movement of the blank-support, and fix the guides adjustably upon the bar, so as to press them closely to the eye of the bracket which supports the end of the spindle. The guides and their support are shown in Figs. 1, 4, and 6, the posts $m$ being attached to bosses $n$, cast upon the sides of the bed, and projected upwardly, with a cross-bar $o$ vertically adjustable upon the posts by means of bolts $p$, fitted to slots $q$. A bracket $r$ is shown fitted adjustably upon an arm $s$, attached to the head F, which carries the blank-support, and the bracket has an eye $r'$, fitted to the blank-spindle 1 outside of the blank J. Parallel guides $t$ are shown fitted adjustably upon the bar $o$ and provided with set-screws $u$ for pressing them toward the sides of the eye $r'$ and with clamp-screws $t'$ to hold them when adjusted. The sides of the eye are shown flattened in the line of the retracting movement of the bracket when the blank-support is drawn away from the cutter, and the guides are made of suitable length to maintain a bearing against such flattened surface during such movement. The guides may be set at various distances apart to fit eyes of different sizes which may be required to support blank-spindles of different diameters. The bracket $r$ and arm $s$ are common in such constructions, and the present improvement consists in providing guides to resist any lateral movement of the blank-spindle and to also permit its retractive movement after cutting each tooth.

Another support for the spindle is shown in Fig. 6, comprising an adjustable stop supported below the eye of the bracket or outer end of the spindle with which it may contact when the blank is lowered into cutting relation with the cutter. Such support is shown in a bent arm or bracket $v$, projected from a rib upon the bar $o$ and having an upwardly-projecting set-screw $w$ to contact with the under side of the eye $r'$. The cutter has a tendency when its teeth penetrate the metal of the blank to draw the blank toward the cutter, and such set-screw or stop resists this tendency and holds the blank-spindle and blank accurately in the required position.

It will be readily understood that a single post of suitable strength may be employed instead of the two posts $m$, with a suitable projection to support guides for the sides of the spindle and a stop like the screw $w$ for the side of the spindle next to the cutter.

It should be understood that the blank-twisting wheel makes no progression in the cutting of all the teeth in a given blank, but oscillates back and forth through a uniform arc for each tooth that is cut, as its function is merely to produce a spiral form of the tooth and to restore the blank to its initial position at the close of each cut. The indexing worm-wheel, upon the contrary, progresses in its rotations by the intermittent movement imparted to it at each release of the stop-arm 40. Such a relation of the blank-twisting wheel and the indexing worm-wheel operates to oscillate the blank-support during the cutting and to permit the indexing of the blank or blank-support without disconnecting the mechanism which oscillates the same. The change-wheels 14', which determine the rotations of the indexing-worm $e'$, furnish a means of varying the indexing for gears of different pitch. The connection of the blank-twisting wheel and the carriage-feed screw with the same shaft 5 furnishes a means, through the change-wheels $f$, to vary the ratio between the movements of the cutter-carriage and the blank-support, and the changeability of the gear-wheels 54 and 55, which connect the feed-shaft 5 with the shaft 53, (which oscillates the blank-support,) furnishes a means of still further varying the movements of the blank-support in relation to the cutter-carriage where extremely quick or slow movements are required to produce an exceedingly great or small inclination for the spiral teeth.

In cutting spiral teeth by a disk cutter, as shown in the drawings, the axes of the cutter-spindle and of the blank do not intersect one another, but the cutter-spindle is set at the desired angle by turning the spindle and its carriage about an axis passing through the center of the cutter at right angles to the axis of the cutter-spindle.

From the above description it will be understood that the invention is not limited to the particular mechanism shown and described, but that the arrangement of the parts and details of construction may be materially varied without departing from the invention.

Having thus set forth the nature of the invention, what is claimed herein is—

1. In a spiral-gear cutter, the combination, with a blank-supporting spindle, of gearing for rotating the same to index the blank and to turn the blank during the cutting of the spiral gears, such gearing comprising two gear-wheels in axial alinement, a frame mounted to rotate with one of said gear-wheels and carrying bearings with indexing-gears mounted thereon and connected to the other of said gear-wheels, a shaft journaled in the center of the frame and connected with such indexing-gears, and means operating upon said center shaft for intermittingly rotating said indexing-gears in various positions of the frame.

2. In a spiral-gear cutter, the combination, with a horizontal bed, a vertical column, a carriage carrying a cutter-spindle and cutter and reciprocated upon the bed to and from the column, and a head movable upon the column with rotatable blank-support, of mechanism for rotating the cutter-spindle and the blank-support during the cutting, a driving-shaft with gearing connected continuously with the mechanism for rotating the blank-support, and operating to intermittingly index the blank-support, and means operated by the driving-shaft for automatically raising the head and moving the blank out of cutting relation during the non-cutting movement of the cutter, substantially as herein set forth.

3. In a spiral-gear cutter, the combination, with a blank-support, and a rotary cutter with support and spindle, having its axis at an angle to the axis of the blank-support and not intersecting the same, of mechanism for rotating said cutter-spindle, mechanism for reciprocating one of said supports parallel to the axis of the blank, mechanism for rotating the blank-support during the cutting, a driving-shaft and gearing connecting said shaft with said mechanism, and means operated by the driving-shaft with means for automatically stopping and starting the same to move the blank out of cutting relation during the non-cutting movement of the reciprocating support, substantially as herein set forth.

4. In a spiral-gear cutter, the combination of a blank-support, a cutter-carriage, mechanism for reciprocating the same, a cutter-spindle thereon with its axis at an angle to the axis of the blank-support and not intersecting the same, a driving-shaft with mechanism for driving the cutter-spindle in various positions of the cutter-carriage, mechanism for rotating the blank-support during the advance of the cutter-carriage, automatic mechanism connected detachably with the driving-shaft for moving the blank-support out of cutting relation upon the return of the cutter-carriage, and means actuated by the cutter-carriage for intermittingly connecting such automatic mechanism with the driving-shaft, substantially as herein set forth.

5. In a spiral-gear cutter, the combination, with the bed A having the parallel ways 12 and the cutter-carriage 11 movable thereon, of the side shaft 3 extended parallel with such ways, cutter-driving gear upon the carriage fitted to slide upon and turn with such side shaft, the turn-table 6 upon the carriage having bearings with the cutter-spindle 10 mounted therein, the vertical shaft 14 journaled in the center of the table, the shaft 8 journaled transversely in the carriage and connected to the vertical shaft by miter-gears and at its outer end to the cutter-driving gear, and the shaft 7 journaled in the turn-table parallel with the cutter-spindle and connected to the vertical shaft by miter-gears and at its outer end to the cutter-spindle, whereby the power is transmitted through separately-journaled shafts to the cutter-spindle in all positions of the carriage and turn-table, substantially as described.

6. In a spiral-gear cutter, the combination, with the bed A having the vertical column B to carry the blank-support, of the driving-shaft 13 extended across the same, ways 12 transverse to such shaft with the carriage 11 movable thereon, the turn-table 6 upon the carriage having bearings with the cutter-spindle 10 journaled therein, the shaft 14 journaled in the center of the turn-table and connected at opposite ends to the cutter-spindle and to the driving-shaft, the feed-shaft 5 parallel with the ways, oppositely-moving drivers $a$ $a'$, fitted to turn loosely upon the feed-shaft, and connected with the driving-shaft 13, the clutch $c$ for alternately connecting said drivers to said feed-shaft, a clutch-lever and connections operated by the movement of the carriage for shifting the clutch, the screw-rod $e$ to feed the carriage with gear-wheels $f$ connecting the same to the feed-shaft, a blank-support vertically adjustable upon the column, and gearing connecting the feed-shaft with the blank-support to rotate the same during the cutting movement of the carriage, whereby the movements of the carriage and the blank-support are simultaneously reversed, substantially as herein set forth.

7. In a spiral-gear cutter, the combination, with the bed A having the vertical column B to carry the blank-support, of the driving-shaft 13 extended across the same, ways 12 transverse to such shaft with the carriage 11 movable thereon, the side shaft 3 connected with the driving-shaft at one side of the bed, the table 6 adjustable upon the carriage with bearings having the cutter-spindle 10 mounted therein, the vertical shaft 14 journaled in the center of the table the shaft 7 in the turn-table and gearing connecting it to the same and to the cutter-spindle, the shaft 8 in the carriage, with gearing connecting the same to the shaft 14 and to the side shaft 3, the feed-shaft 5 upon the side of the bed opposite the shaft 3, oppositely-moving drivers $a$, $a'$, fitted to turn loosely upon the feed-shaft and connected with the driving-shaft 13, a clutch $c$ for alternately connecting said drivers to said feed-shaft, a clutch-lever and connections operated by the movement of the carriage for shifting the clutch, the screw-rod $e$ to feed the carriage, with gear-wheels $f$ connecting the same to the feed-shaft, a blank-support vertically adjustable upon the column, and gearing connecting the feed-shaft with the blank-support to rotate the same during the cutting movement of the carriage, whereby the movements of the carriage and the blank-support are simultaneously reversed, substantially as herein set forth.

8. In a spiral-gear cutter, the combination, with the horizontal bed A and vertical column B, with a carriage and cutter reciprocated upon the bed to and from the column, and the head C movable upon the column with rotary blank-support E, of mechanism for indexing the blank-support, mechanism for rotating the blank-support during the cutting, a driving-shaft with connections to the cutter to rotate the same, the nut $C^2$ and lever $C^4$ supported upon the column for moving the nut vertically, the screw $C'$ fitted to the nut and head, for adjusting the head upon the column, and means connecting such lever with the driving-shaft and operating to automatically raise and lower the nut at the opposite ends of the carriage movement, to clear the blank from the cutter during its retraction.

9. In a gear-cutter, the combination, with a horizontal bed having ways with cutter-carriage and cutter movable thereon, of a driving-shaft with connections to the cutter to rotate the same upon the carriage, an upright column having a blank-support movable vertically thereon, a screw and nut for adjusting the blank-support vertically upon the column, a cam with a clutch rotated by the driving-shaft for turning such cam, and a connection from the cam to the screw and nut for raising and lowering the blank-support, and means actuated by the movement of the cutter-carriage to shift the clutch and turn the cam at each end of the carriage-stroke.

10. In a gear-cutter, the combination, with a horizontal bed having ways with a cutter-carriage and cutter movable thereon, of a driving-shaft with connections to the cutter to rotate the same upon the carriage, an upright column having a blank-support movable vertically thereon, a screw and nut for adjusting the blank-support vertically upon the column, an eccentric cam with a worm-wheel rotated by a worm and clutch connected with the driving-shaft, a clutch-lever with means for normally engaging the clutch and the worm, toes rotated with the cam and worm-wheel, a latch movable adjacent to the toes, and operating at semirotations of the cam to disengage the clutch from the worm, and means actuated by the cutter-carriage at the ends of its stroke to trip the latch and permit the engagement of the clutch and worm to semirotate the cam and thus raise or lower the blank-support.

11. In a gear-cutter, the combination, with a horizontal bed having ways with a cutter-carriage and cutter movable thereon, of a driving-shaft with connections to the cutter to rotate the same upon the carriage, an upright column having a blank-support movable vertically thereon, a screw and nut for adjusting the blank-support vertically upon the column, an eccentric cam with a worm-wheel rotated by a worm and clutch connected with the driving-shaft, a clutch-lever with means for normally engaging the clutch and the worm, toes rotated with the cam and worm-wheel, and a latch movable adjacent to the toes and operated at semirotations of the cam to disengage the clutch from the worm, the trip-rod 16 at the side of the carriage with adjustable dogs and a lug to shift the same, the toggle-arms 19 with a spring-box to hold the same normally bent, a connection to the trip-rod to reverse the toggle, a latch-shaft with arm to disengage the latch from the toes and permit the engagement of the worm, and a connection from the toggle to the latch-shaft to operate the same at each reverse of the carriage movement.

12. In a spiral-gear cutter, the combination, with a suitable bed, of a reciprocating cutter-carriage and a cutter supported thereon, a bearing sustained upon the bed with its axis held parallel to the cutter movement, said bearing having a sleeve therein with blank-twisting wheel secured thereon, a blank-support journaled within the sleeve, a worm-wheel secured upon such blank-support, and gearing carried by the blank-twisting wheel for shifting the worm-wheel to index the blank.

13. In a spiral-gear cutter, the combination, with a suitable bed, of a reciprocating cutter-carriage, a cutter supported thereon, a driving-shaft with mechanism for reciprocating the cutter-carriage, a bearing sustained upon the bed with a sleeve therein having a blank-twisting wheel secured thereon, gearing connecting such blank-twisting wheel and the driving-shaft to turn the wheel and sleeve, a blank-support journaled within the sleeve, a worm-wheel secured upon such blank-support, and gearing carried by the blank-twisting wheel for shifting the worm-wheel to index the blank.

14. In a spiral-gear cutter, the combination, with a suitable bed, of a reciprocating cutter-carriage, a cutter supported thereon, a driving-shaft with mechanism for reciprocating the cutter-carriage, a bearing sustained upon the bed with a sleeve therein having a blank-twisting wheel secured thereon, gearing connecting such blank-twisting wheel and the driving-shaft to turn the wheel and sleeve, a blank-support journaled within the sleeve, a worm-wheel secured upon such blank-support, gearing carried by the blank-twisting wheel for shifting the worm-wheel to index the blank, a friction-driver with connection to such gearing, a stop applied to such train of gearing for arresting its movement, and means connected with the cutter-carriage for actuating such stop.

15. In a spiral-gear cutter, the combination, with a suitable bed, of a reciprocating cutter-carriage, a cutter supported thereon, a driving-shaft with mechanism for reciprocating the cutter-carriage, a bearing sustained upon the bed with a sleeve therein, having a blank-twisting wheel secured thereon, gearing connecting such blank-twisting wheel and the driving-shaft to turn the wheel and sleeve, a blank-support journaled within the sleeve, a worm-wheel secured upon such blank-support, a train of gearing carried by the blank-twisting wheel for shifting the worm-wheel to index the blank, a friction-driver with connections to such gearing, a stop-arm rotated with such train of gearing, a laterally-movable stop opposite to such arm, means for holding the stop normally in the path of the stop-arm, and means actuated by the cutter-carriage for temporarily withdrawing the stop and returning it to its normal position during the single rotation of the stop-arm.

16. In a spiral-gear cutter, the means for turning the blank-support and indexing the blank, consisting of the bearing C having the sleeve D therein with a blank-twisting wheel secured thereto, the blank-support journaled within the sleeve, a worm-wheel secured upon such blank-support, a frame carried by the blank-twisting wheel having a bearing and center shaft in line with the blank-support, a worm carried by the blank-twisting wheel and fitted to the worm-wheel, gearing connecting said center shaft with the worm, a friction-driver to rotate such center shaft, and a stop for controlling the motion of such gearing.

17. In a spiral-gear cutter, the combination with a reciprocating cutter-carriage and a cutter supported thereon, of a bearing parallel with the cutter movement and having a sleeve therein with a blank-twisting wheel secured thereto, the blank-support journaled within the sleeve, the worm-wheel secured upon such blank-support, a frame carried by the blank-twisting wheel having a bearing and center shaft in line with the blank-support, a worm carried by the blank-twisting wheel and fitted to the worm-wheel, gearing connecting such worm with the center shaft, a friction-driver to rotate the center shaft, a stop carried by the frame, a stop-arm journaled adjacent to the stop, and a train of change-wheels connected with the worm and with the stop-arm, to vary the indexing of the blank at pleasure.

18. In a gear-cutter, the combination, with a horizontal bed having ways with a cutter-carriage movable thereon and a cutter supported on said carriage, of a driving-shaft with connections to the cutter to rotate the same upon the carriage, a feed-shaft at the side of the bed with connections to the driving-shaft and connections to the carriage to reciprocate the carriage, an upright column having bearing movable vertically thereon, with sleeve therein to carry the blank-support, and a blank-twisting wheel attached to said sleeve, the upright shaft 25 with gearing adapted to connect it reversely with the feed-shaft, and gearing movable upon the upright shaft with connection to the blank-twisting wheel, whereby the blank-support may be adjusted at various distances above the cutter and rotated during the cutting operation, substantially as herein set forth.

19. In a spiral-gear cutter having a cutter and driving-shaft for rotating the same, and a blank-support and its bearing retractable to clear the blank from the cutter during the non-cutting movement of the same, the combination, with the blank-support and the blank-spindle, of a suitable bed to support the parts, means connected with the driving-shaft for automatically retracting the blank-support, and parallel guides sustained upon the bed and fitted movably to the end of the blank-spindle and extended in the line of its retracting movement to support it during the cutting operation.

20. In a spiral-gear cutter having a cutter and driving-shaft for rotating the same, and a blank-support and its bearing retractable to clear the blank from the cutter during the non-cutting movement of the same, the combination, with the blank-support and the blank-spindle, of a suitable bed to sustain the parts, a bracket extended from the bearing of the blank-support to sustain the blank-spindle, means connected with the driving-shaft for automatically retracting the blank-support, and parallel guides sustained upon the bed and fitted movably to the sides of the bracket in the line of its retracting movement to support it, substantially as herein described.

21. In a spiral-gear cutter having a cutter and driving-shaft for rotating the same, and a blank-support and its bearing retractable to clear the blank from the cutter during the non-cutting movement of the same, the combination, with the blank-support and the blank-spindle, of a suitable bed to sustain the parts, a bracket extended from the bearing of the blank-support with eye fitted to the blank-spindle, means connected with the driving-shaft for automatically retracting the blank-support, and a bar sustained adjustably upon the bed and provided with adjustable parallel guides adapted to fit closely upon the sides of the said bracket and to support it laterally during the cutting operation, while permitting the automatic retraction of the spindle and blank-support, substantially as herein described.

22. In a spiral-gear cutter having the blank-support and its bearing retractable to clear the blank from the cutter during the non-cutting movement of the same, the combination, with the blank-support and the blank-spindle projected therefrom, of a suitable bed to sustain the parts, a bracket extended from said bearing to support the spindle, guides fitted to the sides of the bracket, a stop adjacent to the guides to limit the movement of the bracket toward the cutter, and means upon the bed for supporting the guides and stop.

23. In a spiral-gear cutter having a cutter and driving-shaft for rotating the same, and a blank-support and its bearing retractable to clear the blank from the cutter during the non-cutting movement of the same, the combination, with the blank-support and the blank-spindle, of a bracket extended from the bearing of the blank-support with eye fitted to the blank-spindle, means connected with the driving-shaft for automatically retracting the blank-support, posts upon the opposite sides of the bed with a bar adjustable to the position of the spindle, and parallel guides upon the bar fitted to the sides of the bracket in the line of its retracting movement and operating to support the spindle laterally during the cutting of the blank.

24. In a spiral-gear cutter having a cutter and driving-shaft for rotating the same, and a blank-support and its bearing retractable to clear the blank from the cutter during the non-cutting movement of the same, the combination, with the blank-support and the blank-spindle, of an arm extended from the blank-support bearing above the spindle, a bracket adjustable upon the arm and having eye fitted to the blank-spindle, means connected with the driving-shaft for automatically retracting the blank-support, posts upon the opposite sides of the bed with a bar adjustable to the position of the spindle, and parallel guides upon the bar fitted to the sides of the bracket to support the spindle laterally during the cutting of the blank.

25. The combination, with a blank-supporting spindle, of gearing for rotating the same, comprising a blank-twisting wheel and an indexing-wheel in axial alinement with one another, means for oscillating the blank-twisting wheel to give the spiral twist to the blank-teeth, and means carried by the blank-twisting wheel for intermittingly rotating the indexing-wheel to space the teeth, substantially as described.

26. In a spiral-gear cutter, the combination, with a blank-supporting spindle, of gearing for rotating the same, comprising a blank-twisting wheel and an indexing worm-wheel in axial alinement with one another, means for oscillating the blank-twisting wheel to give the spiral twist to the blank-teeth, a worm engaged with the worm-wheel, and means carried by the blank-twisting wheel for intermittingly turning the worm and rotating the indexing-wheel to space the teeth.

27. In a spiral-gear cutter, the combination, with a reciprocating cutter-carriage and a cutter supported thereon, of a bearing carrying an arbor for a blank-support parallel with the cutter movement, an indexing worm-wheel attached to such arbor, a blank-twisting wheel mounted to turn upon the same axis as the arbor and oscillated during the cutting of each tooth, and a worm and gearing carried by such blank-twisting wheel for intermittingly turning the indexing-wheel to properly space the teeth.

28. In a spiral-gear cutter having a horizontal bed with parallel ways and cutter-carriage movable thereon, a column at the end of the ways with a head adjustable vertically thereon to carry the blank-support, the combination, with such parts, of the blank-support journaled in the head, the blank-twisting wheel and the indexing worm-wheel fitted to rotate about the same axis at the rear of the column, a worm and gearing carried by the blank-twisting wheel to intermittingly rotate the indexing worm-wheel, a frame carried by the blank-twisting wheel with a center shaft to drive such gearing, the vertical indexing-shaft 35 geared to such center shaft, and the horizontal shaft 37 geared thereto and to the driving-shaft 13 with a friction-driver interposed between the center shaft and the driving-shaft, the whole arranged and operated substantially as described.

29. In a spiral-gear cutter having a driving-shaft with connections to rotate the cutter, the combination, with a reciprocating carriage and a cutter supported thereon, of a suitable bed to sustain the parts, a bearing supported upon the bed and having its axis parallel with the cutter movement, and having a blank-support journaled therein, the blank-twisting wheel D' and the indexing worm-wheel E' carried by the bearing and mounted to rotate about the same axis, the worm $e'$ journaled upon the blank-twisting wheel and engaged with the worm-wheel, the plate 32 supported upon the blank-twisting wheel and carrying the center bearing 31 with the center shaft 30 journaled therein, gearing connecting the center shaft with the worm $e'$, the vertical indexing-shaft 35 having gear-wheel 34 movable thereon and connected with the center shaft, and a friction-driver interposed between the driving-shaft and the gear-wheel 34, to permit the intermittent rotation of the center shaft, as and for the purpose set forth.

In testimony whereof I have hereunto set my hand in the presence of two subscribing witnesses.

HENRY E. EBERHARDT.

Witnesses:
　CLAUDE E. HOLGATE,
　THOMAS S. CRANE.